United States Patent
Pandya et al.

(10) Patent No.: US 10,479,925 B2
(45) Date of Patent: Nov. 19, 2019

(54) USE OF HEXAMETHYLENETETRAMINE INTENSIFIER FOR HIGH TEMPERATURE EMULSIFIED ACID SYSTEM

(71) Applicant: Halliburton Energy Services, Inc., Houston, TX (US)

(72) Inventors: Nisha Kaustubh Pandya, Pune (IN); Juanita Cassidy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/502,761

(22) PCT Filed: Sep. 15, 2014

(86) PCT No.: PCT/US2014/055640
§ 371 (c)(1),
(2) Date: Feb. 8, 2017

(87) PCT Pub. No.: WO2016/043703
PCT Pub. Date: Mar. 24, 2016

(65) Prior Publication Data
US 2017/0233638 A1  Aug. 17, 2017

(51) Int. Cl.
*C09K 8/54* (2006.01)
*E21B 41/02* (2006.01)
*E21B 43/25* (2006.01)
*C09K 8/60* (2006.01)
*C09K 8/74* (2006.01)

(52) U.S. Cl.
CPC ........... *C09K 8/54* (2013.01); *C09K 8/602* (2013.01); *C09K 8/74* (2013.01); *E21B 41/02* (2013.01); *E21B 43/25* (2013.01); *C09K 2208/32* (2013.01)

(58) Field of Classification Search
CPC .......... E21B 41/02; E21B 43/25; C09K 8/54; C09K 2208/32
See application file for complete search history.

(56) References Cited

U.S. PATENT DOCUMENTS

| | | |
|---|---|---|
| 1,922,154 A | 8/1933 | de Groote |
| 2,681,889 A | 6/1954 | Menaul et al. |
| 3,831,679 A | 8/1974 | Presley et al. |
| 3,962,102 A | 6/1976 | Crowe |
| 6,068,056 A | 5/2000 | Frenier et al. |
| 6,192,987 B1 | 2/2001 | Funkhouser et al. |
| 7,906,462 B2 * | 3/2011 | Mesher .................... C09K 8/52 166/305.1 |

(Continued)

FOREIGN PATENT DOCUMENTS

WO   2014193507   12/2014

OTHER PUBLICATIONS

International Search Report and Written Opinion of PCT Application No. PCT/US2014/055640 dated May 15, 2015: pp. 1-13.

(Continued)

*Primary Examiner* — Zakiya W Bates
*Assistant Examiner* — Crystal J Miller
(74) *Attorney, Agent, or Firm* — Chamberlain Hrdlicka

(57) ABSTRACT

The invention provides a method, composition, and system for inhibiting corrosion where the composition forms an acid-in-oil emulsion comprising hexamethylenetetramine, a corrosion inhibitor; and at least one emulsifier.

25 Claims, 2 Drawing Sheets

(56) References Cited

U.S. PATENT DOCUMENTS

| | | | |
|---|---|---|---|
| 7,994,099 B2* | 8/2011 | Cassidy | C09K 8/74 507/237 |
| 8,039,422 B1 | 10/2011 | Al-Zahrani | |
| 8,361,937 B2* | 1/2013 | Cassidy | C09K 8/54 166/305.1 |
| 9,012,376 B2* | 4/2015 | Choudhary | C09K 8/54 252/396 |
| 9,193,898 B2* | 11/2015 | Chang | C09K 8/528 |
| 9,303,236 B2* | 4/2016 | Bennett | C11D 3/2006 |
| 9,434,911 B2* | 9/2016 | Bennett | C11D 3/2006 |
| 2007/0010404 A1* | 1/2007 | Welton | C09K 8/54 507/267 |
| 2007/0069182 A1* | 3/2007 | Cassidy | C09K 8/54 252/387 |
| 2007/0071887 A1* | 3/2007 | Cassidy | C09K 8/54 427/97.7 |
| 2010/0099584 A1* | 4/2010 | Mesher | C09K 8/52 507/90 |
| 2010/0167966 A1 | 7/2010 | Gutman et al. | |
| 2010/0261623 A1* | 10/2010 | Cassidy | C09K 8/74 507/243 |
| 2012/0142563 A1* | 6/2012 | Cassidy | C09K 8/54 507/244 |
| 2012/0238479 A1* | 9/2012 | Choudhary | C09K 8/54 507/204 |
| 2012/0316090 A1* | 12/2012 | Chang | C09K 8/528 507/226 |
| 2013/0161013 A1* | 6/2013 | McCoy | F04B 47/00 166/308.1 |
| 2015/0011453 A1* | 1/2015 | Bennett | C11D 3/2006 510/402 |
| 2016/0177226 A1* | 6/2016 | Bennett | C11D 3/2006 507/243 |

OTHER PUBLICATIONS

Brezinski, SPE 52707: "New Environmental Options for Corrosion Inhibitor Intensifiers," SPE International, 1999: p. 1-7.

Cassidy et al., SPE 106185: "Understanding Formic Acid Decomposition as a Corrosion Inhibitor Intensifier in Strong Acid Environments," SPE International, 2007: pp. 1-9.

* cited by examiner

USE OF HEXAMETHYLENETETRAMINE INTENSIFIER FOR HIGH TEMPERATURE EMULSIFIED ACID SYSTEM

BACKGROUND OF THE INVENTION

Acid-in-oil emulsions are typically used to stimulate or enhance hydrocarbon production in existing carbonate reservoir rock formations, such as limestone, dolomite or calcareous-magnesium. Typically, the emulsified acid enters the formation and where employed successfully it creates a barrier causing the acid to release slowly at a distance from the well-bore and to react more slowly. The reaction of the released acid with the formation rock takes place simultaneously at different places inside the formation, resulting in channels that are joined together to form continuous wormholes.

The emulsions also can limit corrosivity of the acid on downhole and other metal equipment because the oil external phase is non-corrosive. When pumping the acid-in-oil emulsions through steel tubing and piping, a corrosion inhibitor is usually added to reduce the corrosive effects of the acid. In operation, the corrosion inhibitor coats the steel surfaces as the emulsion is pumped into the well-bore and the surrounding rock.

Even so, emulsified acids reach useful limits at temperatures greater than about 300° F. because the emulsions become destabilized at such temperatures. As a result of destabilized emulsions, acid exposure increases and corrosion problems can thereby ensue.

BRIEF DESCRIPTION OF THE FIGURES

The drawings illustrate generally, by way of example, but not by way of limitation, various embodiments discussed herein.

DETAILED DESCRIPTION OF THE INVENTION

Figure 1:
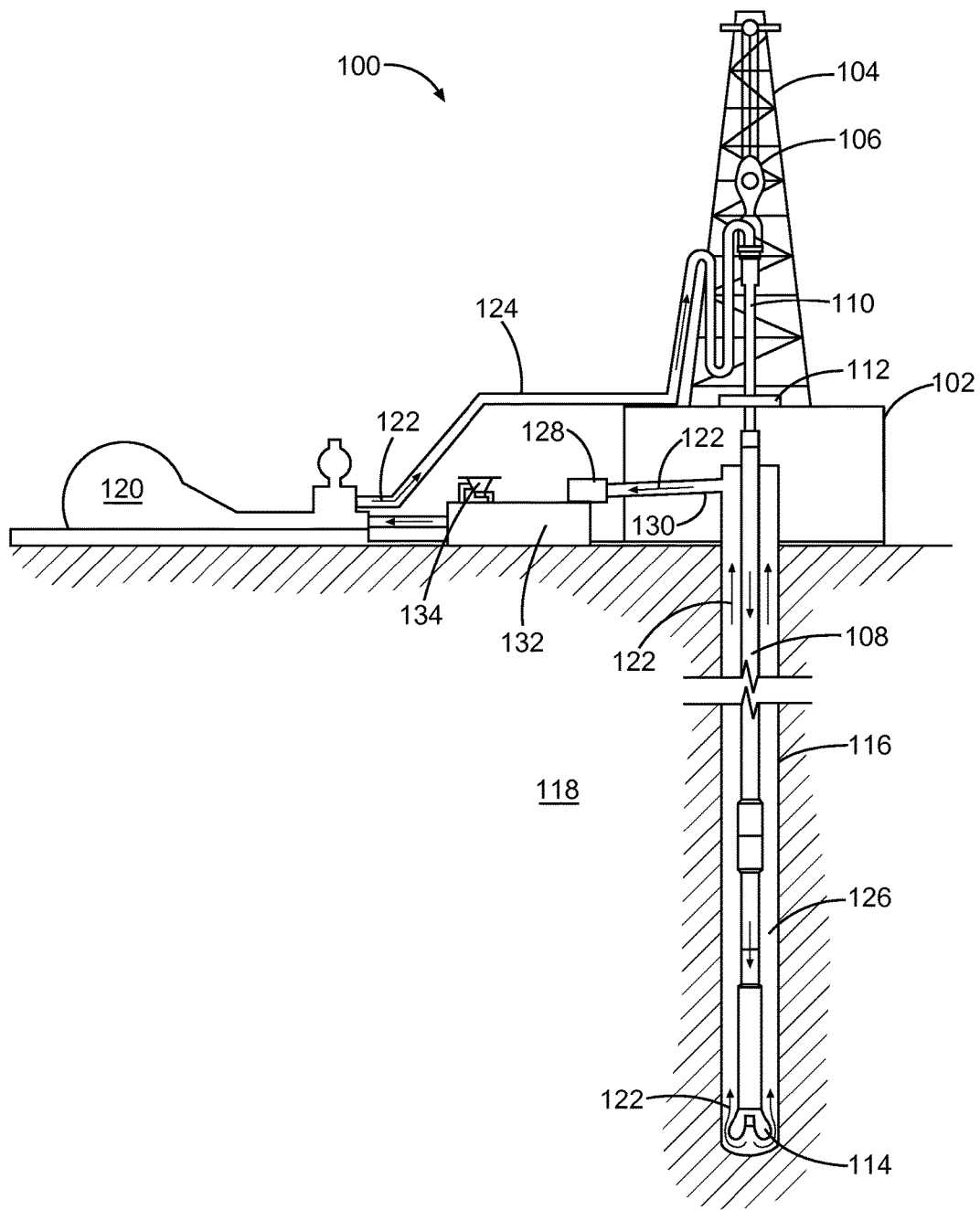
FIG. 1 illustrates a drilling assembly in accordance with various embodiments.

Following is a description of certain embodiments of the disclosed subject matter, examples of which are illustrated in part by the accompanying drawings. While the disclosed subject matter is described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material is any below-ground area that can produce liquid or gaseous petroleum materials, water, or any section below-ground in fluid contact therewith.

Embodiments of the present invention relate to compositions for use in metal oil field equipment and in subterranean formations. More specifically, embodiments of the present invention relate to compositions comprising, among other things, hexamethylenetetramine; a corrosion inhibitor, and at least one emulsifier. It should be understood that, notwithstanding these provisions, the composition does not comprise an acetylenic alcohol. The composition is capable of forming an acid-in-oil emulsion that is useful for treating a subterranean formation, such as for inhibiting corrosion of metal.

Some embodiments of the invention also relate to methods of using the composition in subterranean formations penetrated by wellbores. Hence, the composition of the present invention is suitable for use in, among other applications, acid treatments at elevated temperatures (e.g., temperatures up to 225° F. or higher).

As used herein, the term "drilling fluid" refers to fluids, slurries, or muds used in drilling operations downhole, such as the formation of a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" or "acidic treatment fluids" refers to fluids or slurries used downhole during acidizing treatments downhole. Acidic treatment fluids can be used during or in preparation for any subterranean operation wherein a fluid may be used. Suitable subterranean operations may include, but are not limited to, acidizing treatments (e.g., matrix acidizing or fracture acidizing), wellbore clean-out treatments, and other operations where a treatment fluid of the present invention may be useful. In a matrix acidizing procedure, for example, an aqueous acidic treatment fluid (e.g., a treatment comprising the emulsion described herein, an aqueous base fluid, and spent acid) is introduced into a subterranean formation via a wellbore therein under pressure so that the acidic treatment fluid flows into the pore spaces of the formation and reacts with (e.g., dissolves) acid-soluble materials therein. As a result, the pore spaces of that portion of the formation are enlarged, and the permeability of the formation may increase. The flow of hydrocarbons from the formation therefore may be increased because of the increase in formation conductivity caused, among other factors, by dissolution of the formation material.

In fracture acidizing procedures, one or more fractures are produced in the formation(s) and an acidic treatment fluid is introduced into the fracture(s) to etch flow channels therein. Acidic treatment fluids also may be used to clean out wellbores to facilitate the flow of desirable hydrocarbons. Other acidic treatment fluids may be used in diversion processes and wellbore clean-out processes. For example, acidic treatment fluids can be useful in diverting the flow of fluids present within a subterranean formation (e.g., formation fluids and other treatment fluids) to other portions of a formation, for example, by invading higher permeability portions of a formation with a fluid that has high viscosity at low shear rates.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material, such as a polymer, that is in an at least partially uncured state.

As used herein, the term "fluid control material" (e.g., a "water control material") refers to a solid or liquid material that, by virtue of its viscosification in the flowpaths producing a fluid (e.g., water) alters, reduces or blocks the flow rates of such fluids into the wellbore, such that hydrophobic material can more easily travel to the surface and such that hydrophilic material (including water) can less easily travel to the surface. For example, a fluid control material can be used to treat a well to cause a proportion of a fluid produced, which may include water, to decrease and to cause the proportion of hydrocarbons produced to increase, such as by selectively causing the material to form a viscous plug between water-producing subterranean formations and the wellbore, while still allowing hydrocarbon-producing formations to maintain output.

In some embodiments, the fluid control material mitigates (e.g., reduces, stops or diverts) the flow of fluids (e.g., treatment fluids and water) through a portion of a subterranean formation that is penetrated by the well such that the flow of the fluid into high-permeability portions of the formation is mitigated. For example, in an injection well, it may be desirable to seal off high-permeability portions of a subterranean formation that would otherwise accept most of an injected treatment fluid. By sealing off the high-permeability portions of the subterranean formation, the injected treatment fluid may thus penetrate less permeable portions of the subterranean formation. In other embodiments, the fluid control material helps mitigate the production of undesired fluids (e.g., water) from a well by at least sealing off one or more permeable portions of a treated subterranean formation.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

As used herein, the term "hydrocarbyl" refers to a straight chain, branched, or cyclic hydrocarbon. Exemplary hydrocarbyl groups include alkyl, alkenyl, alkynyl, aryl, cycloalkyl, acyl, and any combination thereof.

The term "alkyl" as used herein refers to straight chain and branched alkyl groups and cycloalkyl groups having from 1 to 30 carbon atoms, 10 to 30 carbon atoms, 12 to 18 carbon atoms, 1 to about 20 carbon atoms, 1 to 10 carbons, 1 to 8 carbon atoms 1 to 5 carbon atoms or, in some embodiments, from 1 to 3 carbon atoms. Examples of straight chain alkyl groups include those with from 1 to 8 carbon atoms such as methyl, ethyl, n-propyl, n-butyl, n-pentyl, n-hexyl, n-heptyl, n-octyl groups. Examples of straight chain alkyl groups include those with from 10 to 30 carbon atoms such as n-decyl, n-undecyl, n-dodecyl, n-hexadecyl, n-icosyl, and the like. Examples of branched alkyl groups include, but are not limited to, isopropyl, iso-butyl, sec-butyl, t-butyl, neopentyl, isopentyl, 2,2-dimethylpropyl, and isostearyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

In general, the composition of the present invention comprises among other things, hexamethylenetetramine; a corrosion inhibitor, and at least one emulsifier, wherein the composition does not comprise an acetylenic alcohol. In some embodiments, the composition further comprises an aqueous acid to form an acid-in-oil emulsion that is useful, for example, in inhibiting corrosion of metal. As shown in the appended examples, one surprising advantage of the composition and its method of use is superior stability of acid-in-oil emulsions at high temperatures.

The amount of corrosion inhibitor present in the composition depends on numerous factors, including but not limited to, the elements and their respective amounts constituting a metal that the composition will contact, contact time, and temperature. The weight percentage of corrosion inhibitor in various embodiments of the invention thus can range from about 0.01% to about 10%, about 0.05% to about 5%, about 0.08% to about 2%, and about 0.09% to about 1%. An exemplary weight percentage of the corrosion inhibitor is about 0.8%.

The amount of hexamethylenetetramine also varies according to other embodiments. For example, hexamethylenetetramine can be present in an amount of about 0.05% to about 10%, about 0.1% to about 7%, about 0.5% to about 5%, and about 1% to about 4% (wt/vol). One exemplary amount is about 2.5% (wt/vol).

As described herein, the composition comprises one or more emulsifiers. Many emulsifiers are known in the art and are commercially available. Non-limiting classes of illustrative emulsifiers include alkoxylated amines, glycols, alcohols, substituted phenols, long chain amides, and long chain polyamines, which when added to hydrocarbons, crude oil or a coal tar distillate, such as naphtha, gasoline, kerosene or carbon tetrachloride, and suitably mixed, will form an emulsion. The weight percentage of emulsifier, alone or in combination with additional emulsifiers, can range from about 0.01% to about 10%, about 0.05% to about 5%, about 0.08% to about 2%, and about 0.09% to about 1%. An exemplary weight percentage of the corrosion inhibitor is about 0.8%.

Other embodiments provide for the presence of one or more corrosion inhibitor intensifiers. When present, the intensifier, alone or combination with additional intensifiers, ranges in amounts of about 0.1% to about 10%, about 0.5% to about 5%, and about 1% to about 3% (wt/vol). An exemplary amount of intensifier is about 1.2%.

In some embodiments, the composition further comprises water-miscible solvents such alcohols (e.g., methanol, ethanol, isopropanol), alcohol ethers (e.g., ethylene glycol methyl ether, ethyleneglycol butyl ether, diethylene glycol, or combinations thereof) or ketones (e.g., acetone, methyl ethyl ketone or combinations thereof)

In some embodiments, the composition further comprises material suitable for use in a downhole fluid. For example, the composition can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, rheology modifier, oil-wetting agents, surfactants, corrosion inhibitors, gases, lost circulation materials, filtration control additives, salts, fibers, thixotropic additives, crosslinkers, rheology modifiers, pH modifiers, chelating agents, scale inhibitors, enzymes, resins, water control materials, markers, hydrate inhibitors, clay stabilizers, bactericides, salt substitutes (such as tetramethyl ammonium chloride), relative permeability modifiers (such as HPT-1™ chemical additive available from Halliburton Energy Services), sulfide scavengers, fibers, nanoparticles, consolidating agents (such as resins and/or tackifiers), surfactants, breakers, fluid loss control additives, asphaltene inhibitors, paraffin inhibitors, salts, bactericides, chelants, foamers, defoamers, emulsifiers, demulsifiers, iron control agents, sulfide cracking agents, particulate diverters, gas phase, carbon dioxide, nitrogen, synthetic polymers, friction reducers or a combination thereof.

In some embodiments, the composition for use in the method of the present invention further comprises an aqueous acid or spent acid, examples of which include hydrochloric acid, hydrofluoric acid, acetic acid, formic acid, citric acid, lactic acid, glycolic acid, sulfamic acid, and the like and combinations thereof. In some embodiments, the term "spent acid," as used herein, refers to an acid composition comprising $CaCl_2$ or $MgCl_2$ as a result of an acid coming in contact with a carbonate reservoir during a drilling operation.

More generally, according to other embodiments, the aqueous acid is one or more mineral acids, carboxylic acids, hydroxyl carboxylic acids, amino carboxylic acids, and combinations thereof. Exemplary mineral acids include hydrochloric acid and hydrofluoric acid. Illustrative carboxylic acids include acetic acid and formic acid. Examples of hydroxyl carboxylic acids are citric acid, lactic acid, glycolic acid, 3-hydroxypropionic acid, and carbonic acid. Exemplary hydroxyl carboxylic acids are ethylenediamine tetracetic acid glutamic acid diacetic acid, and methylglycine diacetic acid.

The invention contemplates in some embodiments ranges of acid concentrations and combinations of two or more of the acids as described above. For instance, in one embodiment the acid is a mineral acid such as HCl that is present in an amount of about 5% to about 28% (wt/wt). Advantages of the invention as described herein are particularly apparent at high acid concentrations, such as about 22% to about 28% (wt/wt). In other embodiments, the acid is a combination of Hl with formic or acetic acids. In still other embodiments, the acid is a combination of about 6% to about 15% (wt/wt) HCl and about 0.5% to about 3% (wt/wt) HF.

One advantage of the composition of the present invention is the formation of acid-in-oil emulsions that exhibit remarkable stability at temperatures above about 200° F. (e.g., above about 220° F., above about 250° F. or above about 300° F., from about 200° F. to about 300° F., from about 200° F. to about 350° F., from about 200° F. to about 250° F., from about 220° F. to about 350° F., from about 250° F. to about 350° F. or from about 300° F. to about 350° F.).

The method and composition disclosed herein directly or indirectly affects one or more components or pieces of equipment associated with the preparation, delivery, recapture, recycling, reuse, and/or disposal of the disclosed composition. For example, and with reference to FIG. 1, the composition may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The composition may be added to, among other things, a drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the composition is added to, among other things, a drilling fluid 122 at any other location in the drilling assembly 100. In at least one embodiment, for example, there is more than one retention pit 132, such as multiple retention pits 132 in series. Moreover, the retention pit 132 can represent one or more fluid storage facilities and/or units where the composition may be stored, reconditioned, and/or regulated until added to a drilling fluid 122.

As mentioned above, the composition may directly or indirectly affect the components and equipment of the drilling assembly 100. For example, the composition may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the composition.

The composition may directly or indirectly affect the pump 120, which is intended to represent one or more of any conduits, pipelines, trucks, tubulars, and/or pipes used to fluidically convey the composition downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition may also directly or indirectly affect the mixing hopper 134 and the retention pit 132 and their assorted variations.

The composition can also directly or indirectly affect various downhole equipment and tools that comes into contact with the composition such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition may also directly or indirectly affect any downhole heat exchangers, valves and corresponding actuation devices, tool seals, packers and other wellbore isolation devices or components, and the like associated with the wellbore 116. The composition may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the composition may also directly or indirectly affect any transport or delivery equipment used to convey the composition to the drilling assembly 100 such as, for example, any transport vessels, conduits, pipelines, trucks, tubulars, and/or pipes used to fluidically move the composition from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

In some embodiments, the present invention provides a system. The system is any suitable system that uses or that can be generated by use of the composition described herein, or that can perform or be generated by performance of the method for using the composition described herein. The system comprises a composition as described hereinabove. The system can also include a subterranean formation including the composition therein. In some embodiments, the composition in the system can also include at least one of an aqueous liquid and a downhole fluid.

In some embodiments, the system includes a tubular disposed in a wellbore. The system includes a pump configured to pump the composition downhole through the tubular and into the subterranean formation.

In some embodiments, the system includes a drillstring disposed in a wellbore. The drillstring can include a drill bit at a downhole end of the drillstring. The system can include an annulus between the drillstring and the wellbore. The system can include a pump configured to circulate the composition through the drill string, through the drill bit, and back above-surface through the annulus. The system can further include a fluid processing unit configured to process the composition exiting the annulus to generate a cleaned drilling fluid for recirculation through the wellbore.

In other embodiments, the present invention provides an apparatus. The apparatus can be any suitable apparatus that can use or that can be generated by use of the composition described herein in a subterranean formation, or that can perform or be generated by performance of a method for using the method for using the composition described herein.

Some embodiments provide systems and apparatus configured for delivering the composition described herein to a downhole location and for using the composition therein. In various embodiments, the systems can include a pump fluidly coupled to a tubular (e.g., any suitable type of oilfield pipe, such as pipeline, drill pipe, production tubing, and the like), the tubular containing a composition described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump is a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 2:
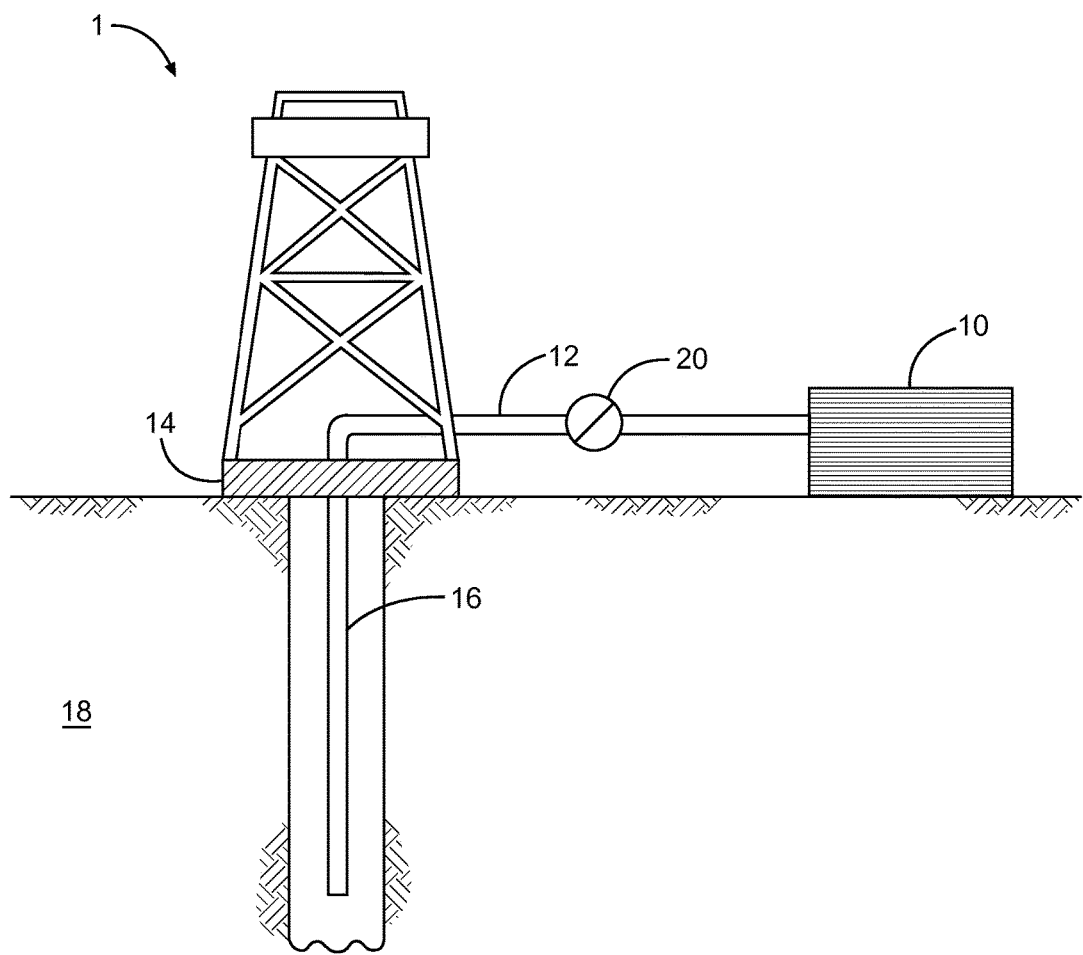
FIG. 2 illustrates a system for delivering a composition to a subterranean formation in accordance with various embodiments.

FIG. 2 shows an illustrative schematic of systems and apparatuses that can deliver compositions of the present invention to a downhole location, according to one or more embodiments. While FIG. 2 generally depicts a land-based system or apparatus, similar systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

The composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, although the present invention is specifically disclosed by exemplary embodiments and optional features, modification and variation of the concepts herein disclosed can be implemented by those of ordinary skill in the art, and such modifications and variations are considered to be within the scope of this invention as defined by the appended claims.

EXAMPLES

The following examples illustrate specific embodiments of the invention. Accordingly, the invention is not limited to the examples given herein.

Example 1 the purpose of this example is to determine corrosion loss and stability of acid-in-oil emulsions for exemplary compositions according to the invention. The aqueous as well as hydrocarbon phases of the emulsion described below are prepared separately using the following mixing order:

A) Aqueous Phase
  1. Fresh water
  2. Corrosion inhibitor intensifier (KI, formic acid, hexamethylenetetramine)
  3. Corrosion inhibitor (HAI-303)
  4. Corrosion inhibitor intensifier (CuCl)
  5. HCl acid
B) Hydrocarbon Phase
  1. Diesel or hydrocarbon oil
  2. Emulsifier (PIBA+Ethomeen T/12)

With constant stirring, the aqueous phase is then added dropwise into the hydrocarbon phase. The final formulation is subjected to a high-shear mixing device, such as a Waring® blender or high-speed homogenizing mixer, until a homogenized invert emulsion is formed.

Specific emulsions were prepared using the concentrations listed below in Table 1.

Then each emulsion was exposed to a standard metal coupon (N-80) under the conditions indicated in Table 1. Specifically, the coupons were low alloy steel N-80 coupons cut from 30 foot pipe joints, the coupons having dimensions of approximately 1.5 in.×1.5 in.×0.1875 in.

TABLE 1

Corrosion Test of Acid-in-oil Emulsions with Hexemethylenetetramine

| Test No. | HCl (aq., %) | Time (h) | Temp. (°F.) | Corrosion Inhibitor (gal/ 1000 gal) | Corrosion Inhibitor Intensifier (gal/ 1000 gal) | Emulsifier (gal, 1000 gal) | Other Additives (lbm/ 1000 gal) | Corrosion Loss (lb/ft$^2$) | Emulsion Stability |
|---|---|---|---|---|---|---|---|---|---|
| 1 | 28 | 2 | 350 | HAI-303$^a$, 8 | formic acid$^b$, 5 | PIBA$^c$, 5.5 Ethomeen T/12$^d$, 2.25 | KI, 90 CuCl$_2$, 25 hexamethyl-enetetramine, 25 | 0.041 | stable |
| 2 | 28 | 3 | 325 | HAI-303, 8 | formic acid, 5 | PIBA, 5.5 Ethomeen T/12, 2.25 | KI, 90 CuCl$_2$, 25 hexamethyl-enetetramine, 25 | 0.048 | stable |
| 3 | 22 | 2 | 350 | HAI-303, 8 | formic acid, 5 | PIBA, 5.5 Ethomeen T/12, 2.25 | KI, 90 CuCl$_2$, 25 hexamethyl-enetetramine, 25 | 0.039 | stable |
| 4 | 22 | 3 | 350 | HAI-303, 8 | formic acid, 5 | PIBA, 5.5 Ethomeen T/12, 2.25 | KI, 90 CuCl$_2$, 25 hexamethyl-enetetramine, 25 | 0.071 | stable |

$^a$HAI-303 ™ is a commercially available, cinnamaldehyde-based, acetylenic-free corrosion inhibitor for hydrochloric acid-based fluids (Halliburton).
$^b$94-96% active.
$^c$PIBA is an emulsifier based upon polyisobutyleneamine that is commercially available as Kerocom ® PIBA 03 (BASF).
$^d$Ethomeen ® T/12 is a commercially available blend of bis(2-hydroxyethyl)tallowalkylamines (Akzo Nobel).

Example 2 the purpose of this example is to determine corrosion loss and stability of acid-in-oil emulsions based on compositions that do not contain hexamethylenetetramine. Specific emulsions were prepared using the concentrations listed below in Table 2 following the procedure described above in Example 1.

Then each emulsion was exposed to a standard metal coupon (P-110) under the conditions indicated in Table 2. Specifically, the coupons were low alloy steel P-110 coupons cut from 30 foot pipe joints, the coupons having dimensions of approximately 1.5 in.×1.5 in.×0.1875 in.

TABLE 2

Corrosion Test of Acid-in-oil Emulsions in the Absence of Hexemethylenetetramine

| Test No. | HCl (aq., %) | Time (h) | Temp. (°F.) | Corrosion Inhibitor (gal/ 1000 gal) | Corrosion Inhibitor Intensifier (gal/ 1000 gal) | Emulsifier (gal, 1000 gal) | Other Additives (lbm/ 1000 gal) | Corrosion Loss (lb/ft$^2$) | Emulsion Stability |
|---|---|---|---|---|---|---|---|---|---|
| 5 | 28 | 2 | 350 | HAI-303, 8 | formic acid, 5 | PIBA, 5.5 Ethomeen T/12, 2.25 | KI, 90 CuCl$_2$, 25 | 0.080 | Unstable |
| 6 | 28 | 3 | 325 | HAI-303, 8 | formic acid, 5 | PIBA, 5.5 Ethomeen T/12, 2.25 | KI, 90 CuCl$_2$, 25 | 0.084 | Unstable |

Data from each set of experiments demonstrate a surprising and superior inhibition of metal corrosion and emulsion stability for those compositions containing hexamethylenetetramine (Tests 1-4) in comparison to compositions that do not (Tests 5 and 6).

The invention contemplates numerous embodiments, including those described hereinabove and those below. The numbering of the following embodiments is not to be construed as designating levels of importance.

We claim:

1. A method of treating a subterranean formation comprising: contacting the subterranean formation with a corrosion inhibition composition consisting essentially of:
   (A) hexamethylenetetramine,
   (B) a corrosion inhibitor,
   (C) a combination of emulsifiers, the combination comprising a long chain polyamine and an alkoxylate amine,
   (D) an acid in an aqueous acid solution, and
   (E) optionally, a corrosion inhibiting intensifier,
   wherein the corrosion inhibition composition does not comprise an acetylenic alcohol, and
   wherein the corrosion inhibition composition is a stable acid-in-oil emulsion at temperatures above about 300° F.

2. The method according to claim 1, wherein the corrosion inhibition composition has the corrosion inhibiting intensifier.

3. The method according to claim 2, wherein the corrosion inhibiting intensifier is potassium iodide, cuprous chloride, or a combination thereof.

4. The method according to claim 1, wherein the corrosion inhibitor has cinnamaldehyde.

5. The method according to claim 4, wherein the corrosion inhibitor has a quaternized quinoline, a quaternized isoquinoline, or a combination thereof.

6. The method according to claim 1 wherein the acid is present in an amount of about 5% to about 35% by weight of the aqueous acid solution in the corrosion inhibition composition.

7. The method according to claim 6, wherein the acid is present in an amount of about 20% to about 30% by weight of the aqueous acid solution in the corrosion inhibition composition.

8. The method according to claim 1, wherein the contacting occurs at a temperature of about 300° F. to about 370° F.

9. The method according to claim 8, wherein the contacting occurs at a temperature of about 325° F. to about 350° F.

10. The method according to claim 1, wherein the hexamethylenetetramine is present in an amount of about 0.5% to about 5% based upon the total weight of the corrosion inhibition composition.

11. The method according to claim 10, wherein the hexamethylenetetramine is present in an amount of about 1% to about 4% based upon the total weight of the corrosion inhibition composition.

12. The method according to claim 11, wherein the hexamethylenetetramine is present in an amount of about 2.5% based upon the total weight of the corrosion inhibition composition.

13. The method according to claim 1, wherein the corrosion inhibitor is present in an amount of about 0.1% to about 5% based upon the total weight of the corrosion inhibition composition.

14. The method according to claim 1, wherein the emulsifier is present in an amount of about 0.1% to about 5% based upon the total weight of the corrosion inhibition composition.

15. The method according to claim 1, wherein the long chain polyamine is PIBA (polyisobutyl amine) and the alkoxylate amine is Ethomeen T/12 (tallow amine ethoxylate).

16. A system configured to perform the method of claim 1, wherein the system comprises:
the corrosion inhibition composition; and
a drill string disposed in a wellbore, the drill string comprising a drill bit at a subterranean end of the drill string.

17. The system according to claim 16, wherein the system further comprises:
an annulus between the drill string and the wellbore; and
a pump configured to circulate the corrosion inhibition composition through the drill string.

18. The system according to claim 17, wherein the system further comprises a fluid processing unit configured to process the composition exiting the annulus to generate a cleaned composition for recirculation through the wellbore.

19. A system configured to perform the method of claim 1, wherein the system comprises:
the corrosion inhibition composition;
a tubular disposed in a wellbore; and
a pump configured to pump the corrosion inhibition composition into the subterranean formation.

20. A corrosion inhibition composition consisting essentially of:
(A) hexamethylenetetramine,
(B) a corrosion inhibitor,
(C) a combination of emulsifiers, the combination comprising a long chain polyamine and an alkoxylate amine,
(D) an aqueous acid, and
(E) optionally, a corrosion inhibiting intensifier,
wherein the corrosion inhibition composition does not comprise an acetylenic alcohol, and
wherein the corrosion inhibition composition is a stable acid-in-oil emulsion at temperatures above about 300° F.

21. The composition according to claim 20, wherein the corrosion inhibition composition has the corrosion inhibiting intensifier.

22. The composition according to claim 21, wherein the corrosion inhibiting intensifier is potassium iodide, cuprous chloride, or a combination thereof.

23. The composition according to claim 20, wherein the corrosion inhibitor has cinnamaldehyde.

24. The composition according to claim 23, wherein the corrosion inhibitor has a quaternized quinoline, a quaternized isoquinoline, or a combination thereof.

25. The corrosion inhibition composition according to claim 20, wherein the long chain polyamine is PIBA (polyisobutyl amine) and the alkoxylate amine is Ethomeen T/12 (tallow amine ethoxylate).

* * * * *